United States Patent [19]

Kondow et al.

[11] 4,314,301
[45] Feb. 2, 1982

[54] PROTECTIVE RELAYING DEVICES

[75] Inventors: Ryotaro Kondow, Tokyo; Junichi Inagaki, Fuchu, both of Japan

[73] Assignee: Tokyo Shibaura Denki Kabushiki Kaisha, Kawasaki, Japan

[21] Appl. No.: 87,156

[22] Filed: Oct. 22, 1979

[30] Foreign Application Priority Data

Oct. 31, 1978 [JP] Japan .................. 53-133220

[51] Int. Cl.³ .............................................. H02H 3/38
[52] U.S. Cl. ........................................ 361/65; 361/62
[58] Field of Search ................. 361/62, 65, 67, 79, 361/80, 82, 84, 86

[56] References Cited

U.S. PATENT DOCUMENTS 3,697,811 10/1972 Little ........................................ 361/82

FOREIGN PATENT DOCUMENTS 39-23231[U] 8/1964 Japan .

OTHER PUBLICATIONS

"Practical Technique on Relaying Device", F. Ando, Published by Sha on Jul. 20, 1976, pp. 124–125.

Primary Examiner—J. D. Miller
Assistant Examiner—Reinhard J. Eisenzopf
Attorney, Agent, or Firm—Stevens, Davis, Miller & Mosher

[57] ABSTRACT

In a protective relaying device comprising first and second potential transformer circuits for transforming voltages of an electric power system, first and second relaying elements are further provided for receiving the output voltages of the first and second potential transformer circuits, respectively so that each of the relaying elements delivers an output of a particular logic state when it operates. When the outputs of the first and second relaying elements coincide with each other, a logic circuit receiving the outputs delivers a tripping signal to a circuit breaker.

8 Claims, 6 Drawing Figures

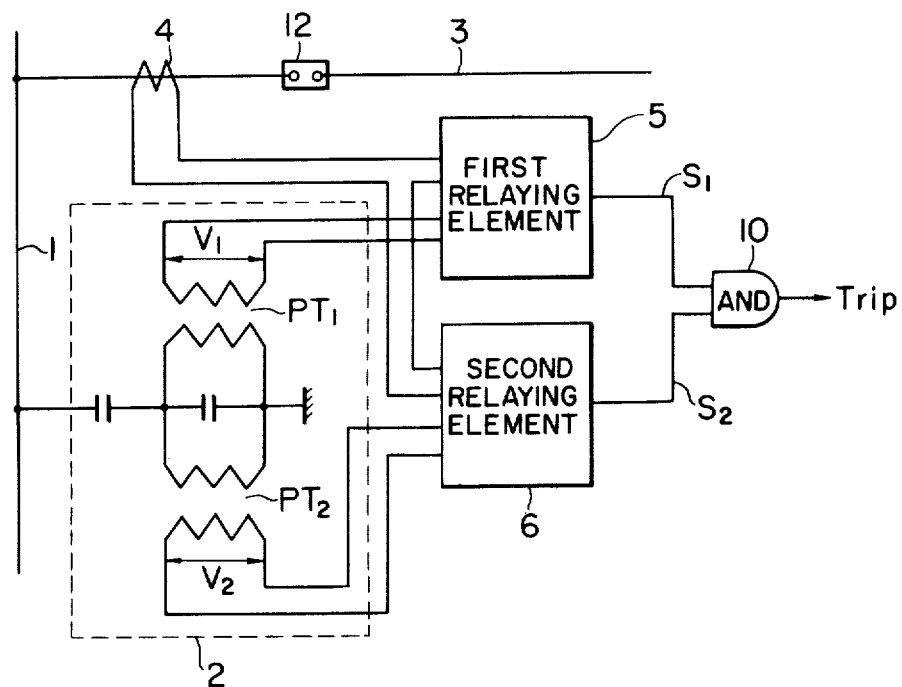
F I G. 2

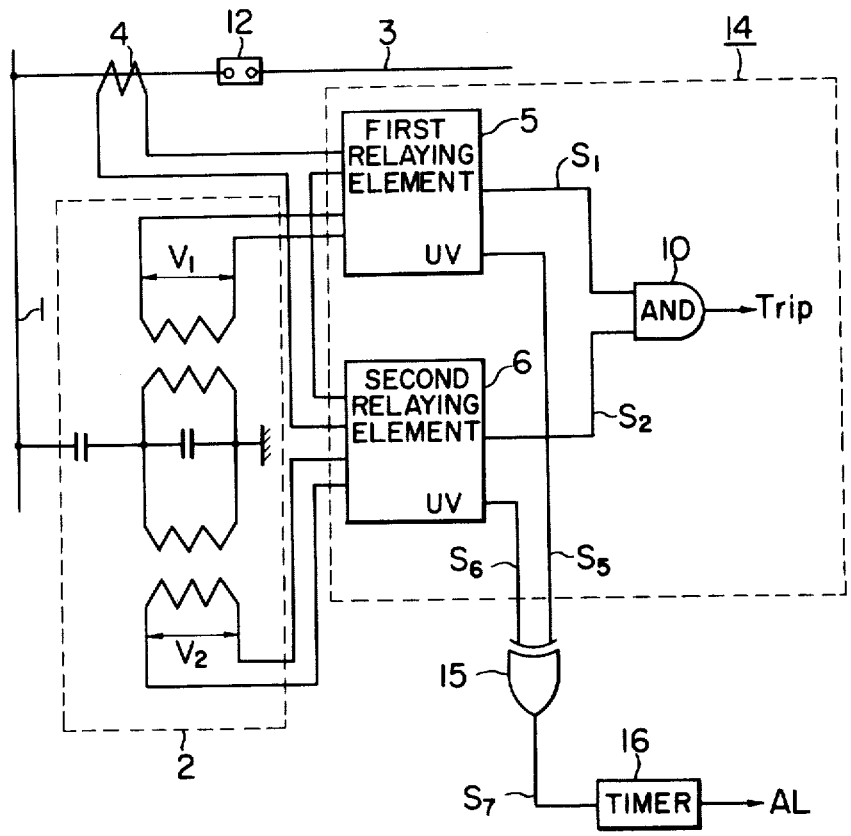
F I G. 4

PROTECTIVE RELAYING DEVICES

BACKGROUND OF THE INVENTION

This invention relates to a protective relaying device which is adapted to protect an electric power system.

The protective relaying device is used to protect an electric power system by instantaneously isolating a faulty part of the system from other parts, thus preventing the faulty effect from extending to the other parts of the power system.

However, where any internal fault occurs in the protective relaying device, an erroneous operation, such as erroneous isolation of valid part or parts from another part of the power system, or making it to isolate the faulty part from another valid part tends to occur, thus causing serious effects on the operation of the power system.

For instance, when a fault occurs in a potential transformer connected to a bus bar or a transmission line for supplying a voltage to a protective relaying device, the output of the potentional transformer is lowered. The protective relaying device receiving the lowered voltage tends to misunderstand that the lowered voltage is caused by a fault in the power system, thus isolating a valid part of the power system from another part, or making it difficult to isolate the faulty part from another part because of its reduced input voltage.

A known device for preventing the difficulties of the conventional protective relaying device is illustrated in FIG. 1.

In this device, a potential device 2 comprising a first potential transformer $PT_1$ and a second potential transformer $PT_2$, is connected to a bus bar 1. A current transformer 4 is connected to a transmission line 3. A first relaying element 5 is provided to receive the output $V_1$ of the first potential transformer $PT_1$ of the potential device 2 as its input voltage and the output of the current transformer 4 as its input current. The first relaying element 5 thus judges the validity of the transmission line 3 from the magnitude and phase relation of these inputs, and operates to protect the line 3.

A second relaying element 6 is also provided to receive the same output from the first potential transformer $PT_1$ and the current transformer 4, and to protect the same transmission line 3.

The first and second relaying elements 5 and 6 are ordinarily termed a faulty section selecting relay and a fault detecting relay, respectively. The first relaying element 5 has a narrower protection range than that of the second relaying element 6, and is responsive only to a fault in a section to be protected by the relaying element 5, while the second relaying element 6 includes, in its protecting range, the protection against the erroneous operation of the relaying element 5 caused by its internal fault.

In the above described conventional protecting relaying device, there is further provided a voltage-unbalance detecting relay 7 which receives the output voltages $V_1$ and $V_2$ of the first and second potential transformers $PT_1$ and $PT_2$ of the potential device 2, and constantly surveys these values to detect any unbalance therebetween. When an unbalance is detected, the detecting relay 7 delivers an output $S_3$ of a logic "1" which is further inverted by a NOT circuit 8.

An AND gate circuit 9 is connected to receive the outputs $S_1$ and $S_2$ of the first and second relaying elements 5 and 6, and the output $S_4$ of the NOT circuit 8 as its inputs. When these three inputs are applied, the AND gate circuit 9 is enabled to deliver a tripping instruction to a circuit breaker 12 in the transmission line 3.

The above described conventional protective relaying device operates as follows.

When the potential device 2 including two potential transformers $PT_1$ and $PT_2$ has no fault, the protection of the power transmission line 3 is carried out correctly by the output of the AND gate circuit 9 which delivers a tripping signal to a circuit breaker 12 when the three inputs $S_1$, $S_2$, and $S_4$ are applied.

However, when a fault occurs in the circuit of the potential device 2, the outputs of the two potential transformers $PT_1$ and $PT_2$ are unbalanced, causing the input voltage of one of the relaying elements 5 and 6 to become lower than the other. The relaying element having a reduced input voltage misunderstands the reduction as a result of a fault in the transmission line 3, and tends to operate erroneously.

The voltage unbalance detecting relay 7 has been provided to eliminate this difficulty. When the output voltages $V_1$ and $V_2$ of the first and second potential transformers are different, that is, when a fault occurs in the circuit of the potential device 2, the output $S_3$ of the relay 7 becomes "1". The output $S_3$ is inverted by the NOT circuit 8 into "0", which is applied to an input of the AND circuit 9.

Accordingly, although a fault occurs in the potential device 2 and either one of the relaying elements 5 and 6 operates, the voltage unbalance detecting relay 7 prevents the delivery of any erroneous tripping signal from the AND gate circuit 9 to the circuit breaker 12.

In the known device shown in FIG. 1, even when a fault occurs in the potential device 2 and unequal voltages are supplied to the relaying elements 5 and 6, the voltage unbalance detecting relay 7 prevents the delivery of the erroneous tripping instruction to the circuit breaker 12. However, the provision of the relaying element 7 has not only increased the production cost, but also reduced the reliability of the conventional protective relaying device.

SUMMARY OF THE INVENTION

A primary object of the present invention is to provide a protective relaying device wherein erroneous tripping of a circuit breaker can be prevented with a reliable and low cost relaying device.

Another object of the invention is to provide a protective relaying device wherein erroneous interruption of a circuit breaker can be prevented regardless of the occurrence of any fault in the potential transformer circuit without requiring any specific relaying element supervising the potential transformer circuit.

Still another object of the present invention is to provide a protective relaying device wherein means for detecting any fault occurring in the potential transformer circuit is provided, and an alarm is issued when the relaying device detects the occurrence of a fault.

According to the present invention, there is provided a protective relaying device comprising first and second potential transformer circuits for transforming voltages picked up from an electric power system, first and second relaying elements receiving the output voltages of the first and second potential transforming circuits, respectively, and a logic circuit delivering a tripping signal to a circuit breaker when the outputs of the first and second relaying elements coincide with each other.

The first and second potential transforming circuits may be combined into a single potential device delivering two output voltages, or the first and second relaying elements may comprise first and second under-voltage detecting elements, respectively, and the outputs of the two under-voltage detecting elements are used for delivering an alarm signal.

Alternatively, the first and second relaying elements may be of digital type relays.

BRIEF DESCRIPTION OF THE DRAWINGS

In the accompanying drawings:

FIG. 2 is a block diagram showing an embodiment of the present invention; and

FIGS. 3, 4, 5, and 6 are block diagrams showing alternative embodiments of the invention.

DESCRIPTION OF THE PREFERRED EMBODIMENTS

Figure 1:
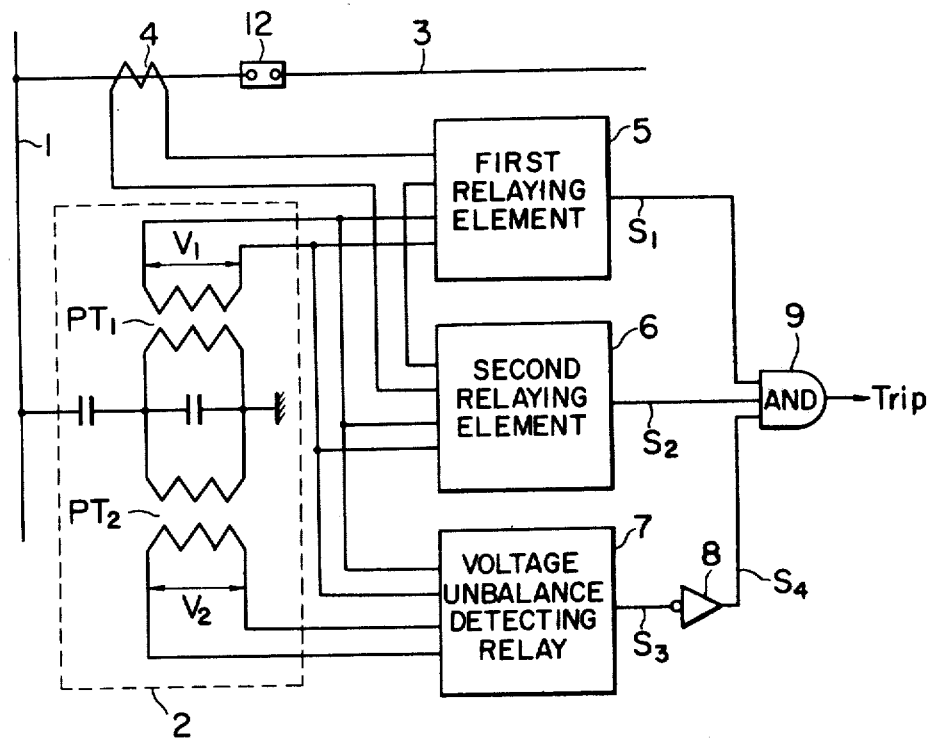
FIG. 1 is a block diagram showing a conventional protective relaying device.

A preferred embodiment according to the present invention is shown in FIG. 2 wherein similar parts as in FIG. 1 are designated by like reference numerals. In this embodiment, a potential device 2 including a first potential transformer $PT_1$ and a second potential transformer $PT_2$ is connected to a bus bar 1, and a current transformer 4 is included in a transmission line 3.

A first relaying element 5 is connected to receive the output voltage $V_1$ of the first potential transformer $PT_1$, and the output of the current transformer 4. The relaying element 5 judges from the magnitude and the phase relation of the two inputs whether the transmission line 3 is valid or not, and carries out the protective operation.

A second relaying element 6 is also provided to receive the output voltage $V_2$ of the second potential transformer $PT_2$ and the output current of the current transformer 4, and to operate as described above with respect to the first relaying element 5.

The output $S_1$ of the first relaying element 5 and the output $S_2$ of the second relaying element 6 are applied to an AND gate circuit 10. When the outputs $S_1$ and $S_2$ are both "1", the AND circuit 10 is enabled to deliver a tripping instruction to a circuit breaker 12.

In the normal condition of the potential device 2, since a tripping instruction is delivered from the AND gate circuit 10 connected to receive the output $S_1$ of the first relaying element 5 and the output $S_2$ of the second relaying element 6 as its inputs, any erroneous operation of either one of the relaying elements due to its internal fault, causes no effects on the output of the AND gate circuit because the other relaying element is in an inoperative state.

When a fault occurs in the potential device 2, and, for instance the output voltage $V_1$ of the first potential transformer $PT_1$ is lowered, the first relaying element 5 misunderstands that the lowering of the input voltage $V_1$ is caused by a fault on the transmission line 3, and delivers an output $S_1$ of a logic "1". However, the output $V_2$ of the potential transformer $PT_2$ is of a normal value, and the output $S_2$ of the second relaying element 6 is a logic "0". Accordingly, the AND gate circuit 10 is disenabled and no tripping instruction is produced.

Conversely, when the potential device 2 has a trouble, and the output voltage $V_2$ of the second potential transformer $PT_2$ is lowered, the relaying element 6 operates erroneously causing the output $S_2$ to become "1". However, the first relaying element 5 is inoperatively holding its output $S_1$ at a logic "0". Thus, the AND circuit 10 would not be enabled and delivers no tripping instruction to the circuit breaker 12.

As described above, the first embodiment of the present invention shown in FIG. 2 does not require any special protective relaying element which is constantly supervising any fault occurring in the potential device, and therefore the manufacturing cost thereof can be reduced, and the reliability of the relaying device can be improved.

Although in the embodiment shown in FIG. 2, the output voltage $V_1$ of the first potential transformer $PT_1$ is applied to the first relaying element 5, and the output voltage $V_2$ of the second potential transformer $PT_2$ is applied to the second relaying element 6, it is apparent that the output voltage $V_1$ may be applied to the second relaying element 6, and the output voltage $V_2$ may be applied to the first relaying element 5, to attain the same result. Furthermore, although the outputs of a potential device 2 including the first and second potential transformers are applied to the first and second relaying elements, respectively, it is apparent that the invention is not necessarily limited to such an application.

Figure 3:
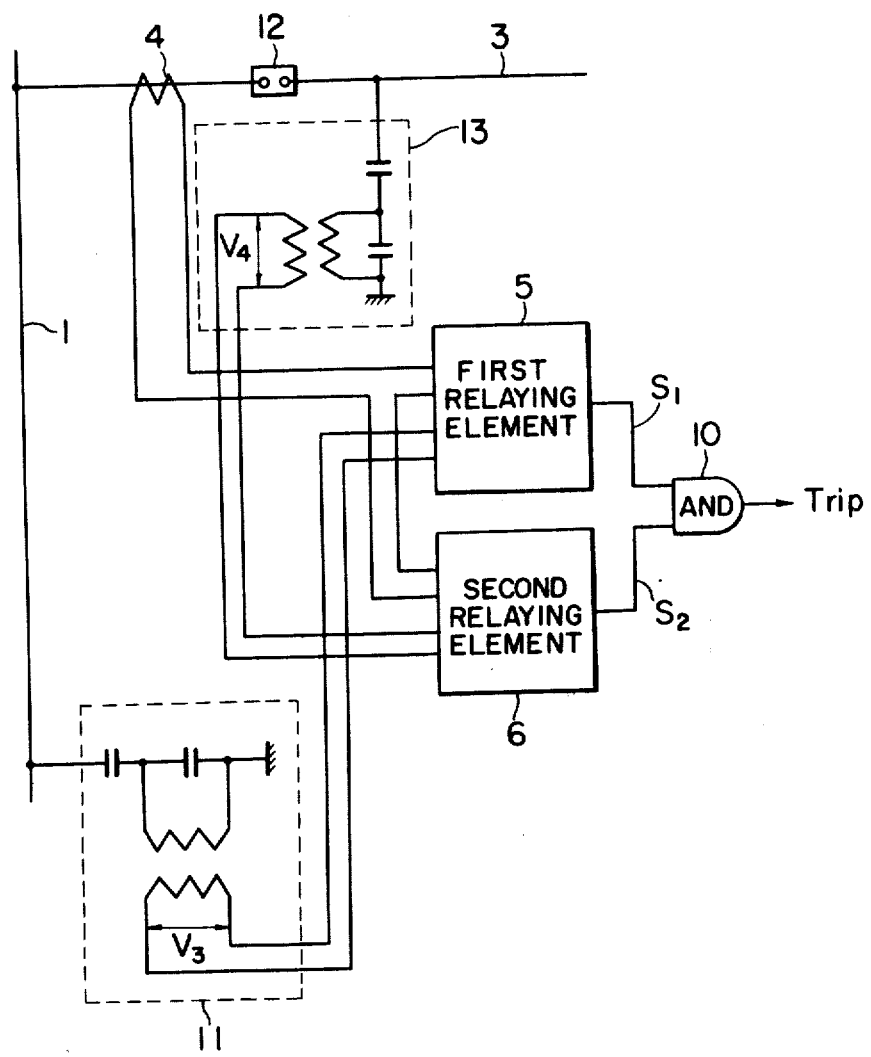

In FIG. 3, there is illustrated another embodiment of the invention wherein like members as those shown in FIG. 1 are designated by like reference numerals. In FIG. 3, the output voltage $V_3$ from a bus potential device 11 connected to a bus bar 1 is applied to a first relaying element 5. On the other hand, the output voltage $V_4$ from a line potential device 13 provided for a transmission line 3 which is connected via a circuit breaker 12 to the bus bar 1 is applied to a second relaying element 6. The output of a current transformer 4 is applied to both the first and second relaying elements 5 and 6. The outputs $S_1$ and $S_2$ of the first and second relaying elements 5 and 6 are applied to an AND gate circuit 10.

The embodiment shown in FIG. 3 operates as follows.

When the bus potential device 11 connected to the bus bar 1 and the line potential device 13 connected to the transmission line 3 are both in the normal state, erroneous operation of either one of the relaying elements 5 and 6 can be prevented, as in the conventional device, by applying the outputs $S_1$ and $S_2$ of the two elements to an AND gate circuit 10 and by utilizing the output of the AND gate circuit 10 as a tripping instruction of a circuit breaker 12.

However, in a case where a fault occurs in the bus potential device 11 connected to bus line 1, the output voltage $V_3$ is lowered. The lowering of the voltage $V_3$ reduces the input voltage of the relaying element 5. As a consequence, the first relaying element 5 misunderstands that the reduction of the input voltage has been caused by a fault on the transmission line 3, and delivers an output $S_1$ in "1" state. However, the circuit of the line potential device 13 connected to the transmission line 3 is in the normal condition, thus causing the second relaying element 6 to deliver an output $S_2$ in "0" state. Thus, the AND circuit 10 would not be enabled and no tripping instruction is supplied to the circuit breaker 12, thereby preventing erroneous tripping of the circuit breaker.

When a fault occurs in the circuit of the line potential device 13 provided for the transmission line 3, the second relaying element 6 operates erroneously because of the reduced input voltage $V_4$, and an output $S_2$ in "1" state is applied to the AND gate circuit 10. In this case too the first relaying element 5 receiving a normal input voltage $V_3$ from the potential device 11 delivers an output $S_1$ in "0" state, and therefore no erroneous tripping instruction is delivered from the AND gate circuit 10. Thus, it is apparent that the embodiment shown in FIG. 3 can achieve the same advantages as those obtainable by the first embodiment shown in FIG. 2.

It is also apparent that the input voltage sources for the first and second relaying elements 5 and 6 may be reversed, in which case the output voltage $V_3$ of the bus potential device 11 is connected to the second relaying element 6, and the output voltage $V_4$ of the line potential device 13 is connected to the first relaying element 5.

It is further apparent that where two transmission lines are provided in parallel, the invention is modified so that the first and second relaying elements 5 and 6 are connected to receive the voltage inputs from potential devices provided for the first and second transmission lines, respectively.

Although the invention has been described for the cases where erroneous tripping of a circuit breaker can be prevented in a case where a fault occurs in either one of the potential devices, it is also possible to provide an alarming circuit and to apply an alarming signal thereto in the same manner as above described.

In FIG. 4, there is illustrated still another embodiment of the present invention, wherein like members and parts as shown in FIG. 2 are designated by like reference numerals.

In this embodiment, a first relaying element 5 and a second relaying element 6, which are similar to those shown in FIG. 2 and combined into a relaying assembly 14 indicated by broken lines, are both provided with an under-voltage detecting element (UV). The under-voltage detecting element (UV) in the relaying element 5 delivers an output $S_5$ when the relaying element 5 is supplied with a low voltage, whereas the under-voltage detecting element (UV) in the relaying element 6 delivers an output signal $S_6$ when the relaying element 6 is supplied with a low voltage. The outputs of the under-voltage detecting elements UV are connected to the two inputs of an exclusive OR circuit 15 which delivers an output $S_7$ of "1" when the two inputs signals $S_5$ and $S_6$ do not coincide. The output $S_7$ of the exclusive OR circuit 15 is connected to a timer circuit 16.

The constuction of other parts of the embodiment shown in FIG. 4 are similar to those of the embodiment shown in FIG. 2, and therefore the detailed descriptions of the construction and operation of these parts are omitted.

The timer circuit 16 is provided to prevent too frequent delivery of the alarm signal AL due to a difference in operational period between the first and second relaying elements 5 and 6 or to any other transients. More specifically, the timer circuit 16 has a delay time (t) longer than any one of the differences caused between the rising and falling instants of the two output signals $S_5$ and $S_6$ of the first and second relaying elements 5 and 6, or by any other transients.

The alarming operation of the embodiment shown in FIG. 4 is as follows.

When a fault occurs in the potential device 2, and the output voltage $V_1$ of the potential transformer is lowered, the under-voltage detecting element (UV) provided in the first relaying element 5 detects the lowered voltage $V_1$, and delivers an output $S_5$ of a logic "1". However, since the output voltage $V_2$ of the potential device 2 has a normal value, the under-voltage detecting element (UV) in the second relaying element 6 is not operated, thus delivering an output $S_6$ of a logic "0". The exclusive OR gate circuit 15, now having two different inputs, delivers an output $S_7$ of a logic "1" which is in turn applied to the timer circuit 16. After a predetermined interval t following the reception of the signal $S_7$, the timer circuit 16 delivers an alarm signal AL.

Conversely, when the output voltage $V_2$ is lowered because of the faulty potential device 2, the under-voltage detecting element (UV) in the second relaying element 6 detects the lowered voltage $V_2$ and delivers an output $S_6$ of logical "1". However, the output $S_5$ of the first relaying element 5 is "0", and therefore an alarm signal AL is delivered from the timer circuit 16.

As is apparent from the above description, the embodiment shown in FIG. 4 is not only capable of preventing erroneous interruption of the circuit breaker 12 upon occurrence of a fault in the potential device, but also delivers an alarming signal which indicates the presence of an internal fault in the potential device 2.

Although in the embodiment shown in FIG. 4, the output voltages $V_1$ and $V_2$ of the first and second potential transformers are applied to the first and second relaying elements 5 and 6, respectively, it is apparent that the voltages $V_1$ and $V_2$ may be applied to the second and first relaying elements 6 and 5, respectively.

Figure 5:
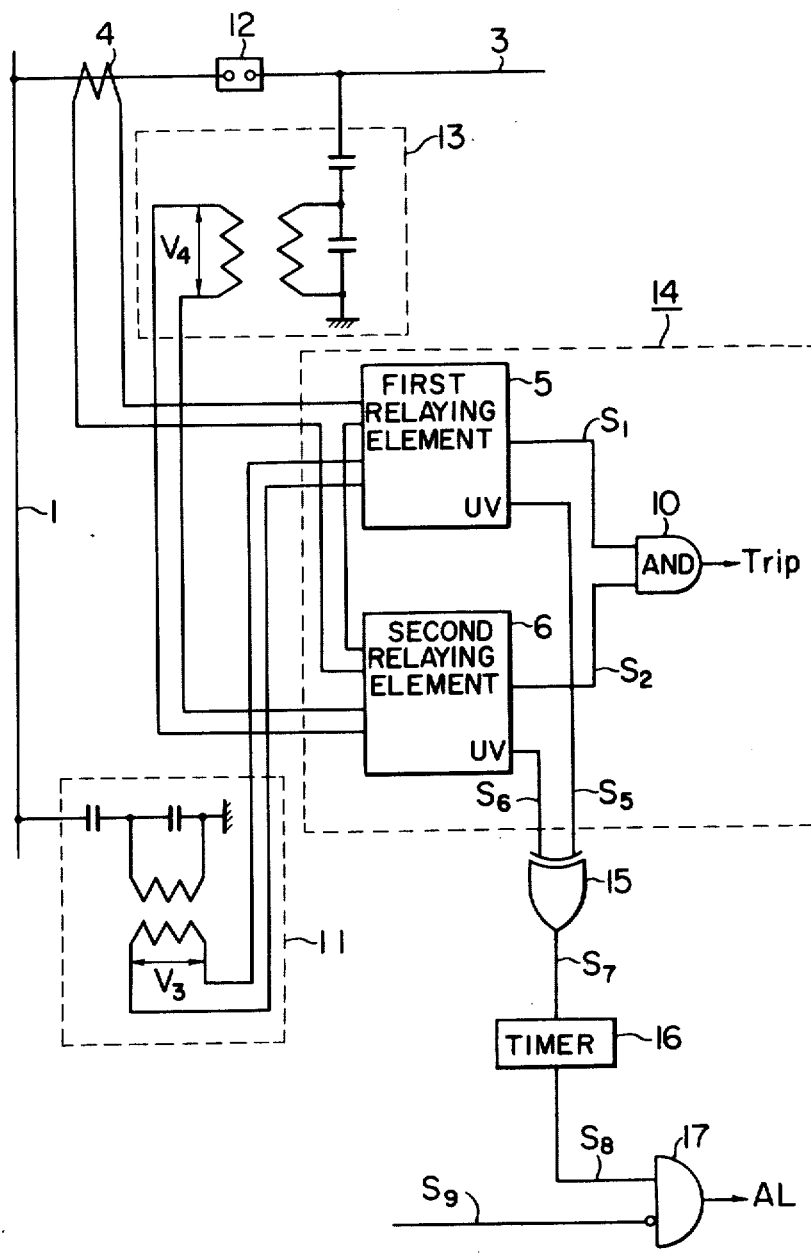

In FIG. 5, there is illustrated a further embodiment of the present invention, wherein an alarming function for a fault in the potential transformer circuit is further added to that of the embodiment shown in FIG. 3, and like members and parts as those shown in FIG. 3 are designated by like reference numerals. Furthermore, the relaying assembly 14, exclusive OR gate circuit 15, and the timer circuit 16 included in this embodiment shown in FIG. 5 are all similar to those shown in FIG. 4. In the embodiment shown in FIG. 5, the output $S_8$ of the timer circuit 16 and a line condition indicating signal $S_9$ are both applied to the inputs of an inhibit gate circuit 17. The line condition indicating signal $S_9$ is "1" when the transmission line 3 is disconnected from the bus bar 1 by the circuit breaker 12 or a disconnecting switch (not shown), and is "0" when the transmission line 3 is connected to the bus bar 1. The inhibit gate circuit 17 delivers an output alarming signal AL of "1" when the output $S_8$ of the timer circuit 16 is "1" and the line condition indicating signal $S_9$ is "0".

The alarming device of the embodiment shown in FIG. 5 operates as follows.

When either one of the bus potential device 11 and the line potential device 13 becomes faulty, the relay assembly 14 can prevent any erroneous tripping of a circuit breaker as in the embodiment shown in FIG. 3.

On the other hand, when a fault occurs in the bus potential device 11, an under-voltage detecting element (UV) included in the first relaying element 5 detects the lowered voltage $V_3$ and delivers an output signal $S_5$ of a logic "1". However, the output $S_6$ delivered from an under-voltage detecting element (UV) included in the second relaying element 6 is a logic "0", and therefore the output $S_7$ of an exclusive OR gate circuit 15 becomes "1". The timer circuit 16 receiving this signal $S_7$ delivers an output signal $S_8$ of "1" after a predetermined interval t. In a case where the transmission line 3 is connected to the electric power system, the line condition indicating signal $S_9$ is "0". Thus, an alarm signal AL is delivered from the inhibit gate circuit 17.

However, when the transmission line 3 is disconnected from the power system, the output $V_4$ of the line potential device 13 is lowered regardless of the valid condition of the potential device itself, and the under-voltage detecting element (UV) in the second relaying element 6 detects the lowered voltage and delivers an output $S_6$ of a logic "1". However, the valid bus potential device 11 causes to deliver an output $S_5$ of "0" from the under-voltage detecting element (UV) in the first relaying element 5, and hence the output $S_7$ of the exclusive OR gate circuit 15 becomes "1". Although the output $S_8$ of the timer circuit 16 becomes "1" after the predetermined time t, the line condition indicating signal $S_9$ at this time is also "1", and therefore no alarm signal AL is delivered from the inhibit gate circuit 17.

In a case where the transmission line 3 is connected to the bus line 1 and fault occurs in the line potential device 13, the under-voltage detecting element (UV) in the second relaying element 6 detects the low voltage $V_4$ and delivers an output $S_6$ of "1". However, the output $S_5$ of the under-voltage detecting element (UV) in the first relaying element 5 is of a logic "0", and therefore the output $S_8$ of the timer circuit 16 becomes "1" as in the case in which the transmission line 3 is disconnected. However, since the line condition indicative signal $S_9$ is "0" in this case, the inhibit gate circuit 17 delivers an alarm signal AL.

According to the embodiment shown in FIG. 5, the voltage outputs $V_3$ and $V_4$ of the bus potential device 11 and the line potential device 13 are supplied to the first relaying element 5 and the second relaying element 6, respectively, and the lowering in the input voltages $V_3$ and $V_4$ is detected by the under-voltage detecting elements (UV) in the first and second relaying elements 5 and 6, respectively. Thus any erroneous trip of the circuit breaker 12 can be prevented effectively, and an alarming signal AL is delivered from the inhibit gate circuit 17.

Although in the embodiment shown in FIG. 5, the output voltages of the bus potential device and the line potential device have been supplied to the first relaying element 5 and the second relaying element 6, respectively, the output voltages of the bus potential device 11 and the line potential device 13 may be supplied to the second relaying element 6 and the first relaying element 5, respectively.

Furthermore, where first and second electric power transmission lines are provided in parallel, and the output voltages of first and second line potential devices are supplied to the first relaying element 5 and the second relaying element 6, respectively, it is apparent that the erroneous tripping of a circuit breaker can be prevented, and the occurrence of a fault in either of the potential devices can also be alarmed in accordance with the present invention.

The advantage of the present invention becomes more apparent when the relaying elements of a digital type including a microcomputer are used for the first and second relaying elements 5 and 6.

Since each of the digital relaying elements can accomplish a number of protective relaying functions, the conventional protective relaying device shown in FIG. 1 may be modified so that the first relaying element 5 is replaced by a first digital relay, and both of the second relaying element 6 and the voltage-unbalance detecting relay 7 are replaced by a second digital relay. Then, the second digital relay receives the output current from the current transformer 4 and the output voltages $V_1$ and $V_2$ from the potential device 2. When the conventional protective relaying device modified as described above is used for protecting a commercial three phase electric power system, the second digital relay requires three phase current inputs from a three-phase current transformer and a total of six phase voltage inputs from a three-phase potential device having first and second potential transformers, thus requiring inputs of a number corresponding to nine phases.

As will be described hereinlater in more detail, each of the first and second digital relays ordinarily requires an auxiliary current transformer, an auxiliary potential transformer, an analogue filter, a sample holding circuit and the like for each of the current inputs or voltage inputs, and also a multiplexer which is provided with inputs of a number equal to that of the entire inputs of the digital relay. Furthermore, a memory device which memorizes sampled values obtained from each of the inputs will be required.

Apparently, the number of the required circuit components is proportional to the number of the inputs (or to the number of phases), and therefore the cost for manufacturing the digital relay is increased in accordance with the increase in number of the inputs (or the number of phases), and the reliability of the digital relay is thereby reduced.

According to the present invention, the number of the circuit components required for the second digital relay can be reduced because the number of the inputs in this case can be reduced from that corresponding to 9 phases as described above to that corresponding to 6 phases without reducing the capability of preventing the erroneous interruption of the circuit breaker due to the internal fault of the potential device.

Figure 6:
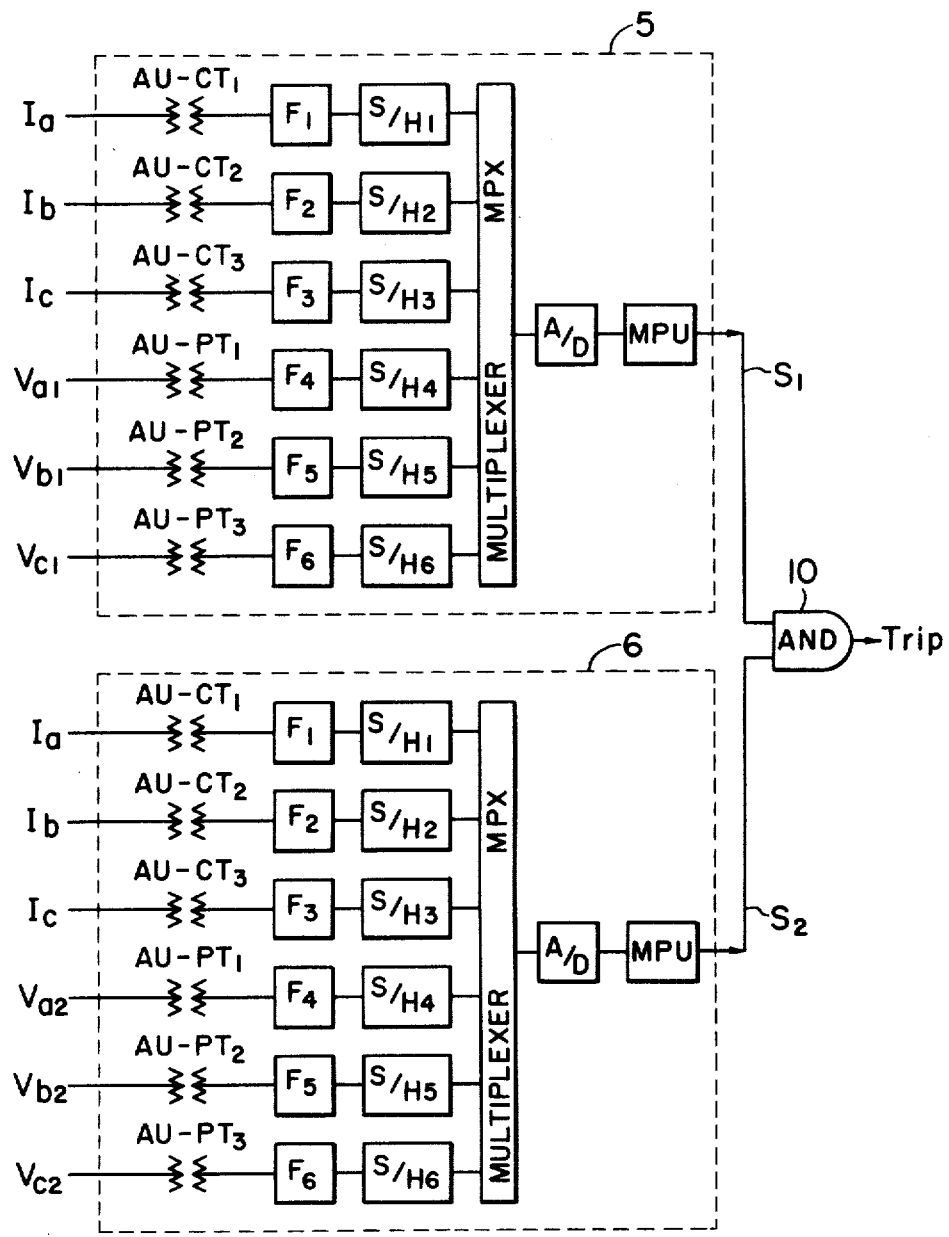

FIG. 6 illustrates still another embodiment wherein the first embodiment of this invention is applied to a three-phase power system, and wherein relaying elements of digital types are used for the first and second relays 5 and 6. As described briefly hereinbefore, input currents $I_a$, $I_b$, and $I_c$ obtained from a three-phase current transformer (not shown) are converted into voltages of appropriate values by auxiliary transformers AU-CT$_1$, AU-CT$_2$, and AU-CT$_3$, and these voltages are applied to filters $F_1$, $F_2$, and $F_3$, respectively. From these filters, only the fundamental-wave components of the voltages are delivered to sample holding circuits S/H$_1$, S/H$_2$, and S/H$_3$, which sample the inputs, for instance, every 30° of the electric angles, and hold the sampled values. The outputs of the sample holding circuits S/H$_1$, S/H$_2$, and S/H$_3$ are supplied to a multiplexer MPX.

On the other hand, the output voltages $V_{al}$, $V_{bl}$, and $V_{cl}$ of a first three phase potential transformer of a potential device (not shown) are applied to auxiliary transformers AU-PT$_1$, AU-PT$_2$, and AU-PT$_3$, respectively, to be converted into appropriate voltages. The outputs of the auxiliary transformers are passed through filters $F_4$, $F_5$, and $F_6$, and only the fundamental-wave components of the output voltages are delivered to sample holding circuits S/H$_4$, S/H$_5$, and S/H$_6$. The sample holding circuits S/H$_4$, S/H$_5$, and S/H$_6$ having similar construction as that of the sample holding circuits S/H$_1$, S/H$_2$, and S/H$_3$, and the outputs of the same circuits S/H$_4$, S/H$_5$, and S/H$_6$ are delivered to the aforementioned multiplexer MPX.

The multiplexer MPX switches the six inputs in a predetermined sequence, and delivers the outputs with equal intervals. A series of the outputs from the multiplexer MPX are converted by an analogue-digital (A/D) converter into digital values, and the thus converted outputs are applied to a microprocessor unit MPU. In the microprocessor unit MPU, a central processing unit (CPU), memory devices (MEMO), and an input/output device (I/O) are included although these are not indicated specifically. The central processing unit processes the digital values sent from the A/D converter successively in accordance with a program memorized in one of the memory devices, thus carrying out a relaying operation required for the protective relaying element. The output of the microprocessor unit MPU is delivered from the input/output device (I/O) as an output $S_1$.

The construction of the second digital relay 6 is quite the same as that of the above described first digital relay 5, except that the input voltages $V_{a2}$, $V_{b2}$, and $V_{c2}$ from a second three phase potential transformer of a potential device (not shown) are applied to the auxiliary transformers $AU-PT_1$, $AU-PT_2$, and $AU-PT_3$, and that the program memorized in the memory device in the microprocessor unit MPU is different from that in the first digital relay 5. The second digital relay 6 delivers an output $S_2$ which is applied to an AND gate circuit 10 together with the output $S_1$ of the first digital relay 5. The AND gate circuit delivers an output of "1" when the outputs $S_1$ and $S_2$ of the first and second digital relays 5 and 6 are both "1".

As is apparent from the above description, the number of the inputs to the first and second digital relays 5 and 6 is six corresponding to that of six phases, and is smaller by three than that of the inputs in the case where the relaying elements in the conventional relaying device shown in FIG. 1 are simply replaced by relaying elements of digital types.

We claim:

1. A protective relaying device for protecting an electric power system, comprising first and second potential transformer circuits for transforming voltages of said electric power system, a current transformer for picking up current flowing through said electric power system, first and second relaying elements connected to receive the output voltages of the first and second potential transformer circuits, respectively, and also the output of said current transformer, wherein each of said relaying elements transmits a particular logic state output when it operates, and a logic circuit delivering a tripping signal to a circuit breaker of said power system when the logic state outputs of said first and second relaying elements are the same.

2. A protective relaying device as set forth in claim 1 wherein said first and second relaying elements are a faulty section selecting relay and a fault detecting relay, respectively.

3. A protective relaying device as set forth in claim 2 wherein said first and second potential transformer circuits are combinedly included in a single potential device connected to said electric power system.

4. A protective relaying device as set forth in claim 3 wherein said first and second relaying elements include first and second under-voltage detecting elements, respectively, the outputs of said first and second under-voltage detecting elements are applied to the inputs of an exclusive OR gate circuit, and the output of said exclusive OR gate circuit is delivered through a delay circuit to an alarming device.

5. A protective relay device as set forth in claim 4 wherein when the outputs of the remaining parts of said first and second relaying elements, other than the under-voltage detecting elements, coincide with each other, said logic circuit delivers a tripping signal to said circuit breaker.

6. A protective relaying device as set forth in claim 2 wherein said first potential transformer circuit is connected to a bus bar of said electric power system while said second potential transformer circuit is connected to a transmission line of said electric power system.

7. A protective relaying device as set forth in claim 6 wherein said first and second protective relaying elements include first and second under-voltage detecting elements, respectively, the outputs of the first and second under-voltage detecting elements are applied to the inputs of an exclusive OR gate circuit, the output of the exclusive OR gate circuit is connected through a delay circuit to an input of an inhibit gate circuit, a line condition indicating signal, which is logic "1" when said transmission line is not applied with voltage, is applied to an inhibit input of said inhibit gate circuit, and the output of the inhibit gate circuit is applied to an alarming device.

8. A protective relaying device as set forth in claim 1 wherein said first and second relaying elements are of digital type.

* * * * *